United States Patent [19]
Fukumoto et al.

[11] Patent Number: 5,380,573
[45] Date of Patent: Jan. 10, 1995

[54] OPTICAL RECORDING MEDIUM

[75] Inventors: Atsushi Fukumoto, Kanagawa; Toshiki Udagawa, Tokyo; Shunji Yoshimura, Tokyo; Masumi Ohta, Tokyo; Masumi Ono, Kanagawa; Kouichi Yasuda, Tokyo, all of Japan

[73] Assignee: Sony Corporation, Tokyo, Japan

[21] Appl. No.: 930,702

[22] PCT Filed: Oct. 18, 1991

[86] PCT No.: PCT/JP91/01436
§ 371 Date: Oct. 6, 1992
§ 102(e) Date: Oct. 6, 1992

[87] PCT Pub. No.: WO92/15092
PCT Pub. Date: Sep. 3, 1992

[30] Foreign Application Priority Data

Feb. 15, 1991 [JP] Japan .................. 3-044501

[51] Int. Cl.⁶ .................................. B32B 3/00
[52] U.S. Cl. ........................... 428/64; 428/65; 428/457; 428/913; 428/694 MM; 369/288
[58] Field of Search .............. 428/64, 65, 457, 913, 428/694 MM; 430/945; 346/76 L, 135.1; 369/288

[56] References Cited

FOREIGN PATENT DOCUMENTS

| | | |
|---|---|---|
| 0258978 | 3/1988 | European Pat. Off. |
| 0305979 | 3/1989 | European Pat. Off. |
| 0405741 | 1/1991 | European Pat. Off. |
| 62-177737 | 8/1987 | Japan . |
| 64-50257 | 2/1989 | Japan . |
| 0143042 | 6/1989 | Japan . |
| 01143041 | 6/1989 | Japan . |

OTHER PUBLICATIONS

Patent Abstracts of Japan, vol. 8, No. 163 (P-290), Jul. 27, 1984, JP-A-59 058 639 (Hitachi) Apr. 4, 1984.

Primary Examiner—Patrick J. Ryan
Assistant Examiner—Elizabeth Evans
Attorney, Agent, or Firm—Hill, Steadman & Simpson

[57] ABSTRACT

An optical recording medium has a multi-layer film including a reproducing layer and a recording holding layer, in which, while a readout light is radiated to the optical recording medium for transcribing signals magnetically recorded in the recording holding layer to the reproducing layer, the signals are converted by photomagnetic effects into optical signals which are read. Alternately, an optical recording medium has phase pits formed thereon in accordance with signals and changed in reflectance with temperature, in which, while a readout light beam is radiated to the optical recording medium and the reflectance is changed partially within a scanning spot the readout light beam, the phase pits are read. The track pitch p of pits RP of recording signals in a direction at right angles to the scanning direction of the laser light is set to not more than one-half the spot diameter of the laser light to raise the track density to improve the recording capacity of the recording medium.

2 Claims, 12 Drawing Sheets

← LIGHT INTENSITY
←--- TEMPERATURE

OPTICAL RECORDING MEDIUM

TECHNICAL FIELD

This invention relates to an optical recording medium from which signals may be read while the recording medium is irradiated with a light beam. More particularly, it relates to an optical recording medium in which the high density information can be reproduced.

BACKGROUND ART

An optical recording medium may be roughly classified into a read-only medium, such as a so-called compact disc, and a medium on which signals may be recorded, such as a magneto-optical disc. With these recording media, it is desired to raise the recording density further because digital video signals as recording signals are in need of a data volume several to ten times or more the data volume for digital audio signals, and also because there is a demand for further reducing the size of a product such as a player by reducing the size of the recording medium such as a disc even when recording the digital audio signals.

Meanwhile, the recording density of the optical recording medium is governed by the line density along the scanning direction of the recording tracks and the track density conforming to an interval between adjacent tracks in a direction perpendicular to the scanning direction. The opto-physical limits of the line and track densities are governed by the wavelength λ of a light source and the numerical aperture NA of an objective lens. In general, a readout limit of 2NA/λ is generally accepted as for a spatial frequency during signal reproduction. For this reason, realizing high density in an optical recording medium, it is thought to be necessary to shorten the wavelength λ of the light, source of the reproducing optical system, such as a semiconductor laser, and to increase the numerical aperture NA of the objective lens.

However, since there is also a limit, in improving the wavelength λ of the light, source or the numerical aperture NA of the objective lens, research is under way for improving the structure of the recording medium and the reading method to increase the recording density.

The density in a direction at right, angles to the laser scanning direction (recording track direction) and the pitch arraying distance (so-called track density and a track pitch as a reciprocal thereof) are hereinafter scrutinized. The soot diameter produced on irradiation of the recording medium with the laser light, (diameter of a so-called first dark ring) is given by $$1.22\lambda/NA$$

where λ is a wavelength of the laser light and NA the numerical aperture of an objective lens. For NA=0.5 and λ=780 nm (0.78 μm), the spot, diameter is 1.9 μm. Although a usual limit, of 1.5 to 1.6 μm is set for a pit, arraying interval in the direction at right, angles to the laser scanning direction (so-called track pitch) because of crosswalk from neighboring tracks, it is desired to improve the limit further.

In view of the above described status of the art, it is an object of the present invention to provide an optical recording medium in which the above-mentioned crosstalk may be diminished by a simplified arrangement, for further improving the so-called track density (recording density in a direction at right angles to the laser light, sweeping direction).

DISCLOSURE OF THE INVENTION

In one aspect, of the present, invention, an optical recording medium has a multi-layer film as a recording layer The multi-layer film has at least a reproducing layer and a recording holding layer magnetically coupled to each other. The recording holding layer has signals magnetically recorded therein previously, the reproducing layer has magnetic domains aligned previously. A readout light is radiated to the reproducing layer of the magneto-optical recording medium for heating the reproducing layer for erasing the recording holding layer and the reproducing layer, the signals are converted under photomagnetic effects into optical signals which are read. The minimum pit interval of the recording signals in a direction perpendicular to the scanning direction of the readout beam is selected to be not more than one half the spot diameter of the readout beam.

In another aspect of the present invention, an optical recording medium has phase pits formed thereon and has reflectance changed with temperature. While readout light is radiated to the optical recording medium for partially changing reflectance within a scanning spot of the readout light, the phase pits are read. The minimum pit interval of the recording signals in a direction perpendicular to the scanning direction of the readout light is selected to be not more than one half the spot diameter of the readout light.

Thus, with the optical recording medium according to the present invention, the pit arraying interval perpendicular to the scanning direction of a light beam is selected to be not larger than one half the beam spot for improving the recording density in such direction and hence the recording density of the recording medium.

BEST MODE FOR CARRYING OUT THE INVENTION

Referring to the drawings, certain embodiments of an optical recording medium according to the present invention will be explained. First an embodiment in which the present invention is applied to a magneto-optical recording medium as a recordable medium, and then an embodiment in which the present invention is applied to a variable reflectance optical recording medium as a medium which may at least be reproduced, will be explained.

The magneto-optical recording medium is comprised of a transparent or light-transmitting substrate of e.g. polycarbonate, on a major surface of which a magnetic layer having an axis of easy magnetization in a direction perpendicular to the film surface and exhibiting superior photomagnetic effects, such as a thin layer of a rare earth-transition metal alloy, are deposited together with a dielectric layer and a surface protective layer etc. A laser light for example, is radiated from the side of the transparent substrate for recording and/or reproducing signals. Signals are recorded on the magneto-optical recording medium by so-called thermo-magnetic recording in which the magnetic layer is locally heated by e.g. laser light radiation to close to the Curie temperature to reduce the coercivity to zero in this region and a recording magnetic field is applied to this region from outside for magnetization in the direction of the recording magnetic field. The recorded signals may be reproduced by taking advantage of the magneto-optical effect such as the so-called magnetic Kerr effect or Faraday effect in which the plane of polarization of the linearly polarized light such as laser light is rotated according to the direction of the magnetization of the magnetic layer.

The variable reflectance type optical recording medium is produced by depositing a material changed in reflectance with temperature on a transparent substrate on which phase pits are formed. During signal reproduction, the readout light is radiated on the recording medium and the reflectance is partially changed within the scanning spot of the readout light to read out the phase pits.

In the embodiment shown in FIG. 1, a medium for high density reproduction of the mixed type of the erasure and relief types as later explained is employed as a magneto-optical recording medium. This magneto-optical recording medium has, as a recording layer, an exchange-coupled magnetic multi-layer film at least including a reproducing layer and a recording holding layer magnetically coupled to each other. For reproducing the magneto-optical recording medium in which signals are magnetically recorded on the recording holding layer and magnetic domains in the reproducing layer are aligned, a laser light is radiated to the reproducing layer for heating the reproducing layer and signals magnetically recorded on the recording holding layer are converted by photomagnetic effects into optical signals as the signals are transcribed to the reproducing layer.

Figure 1:
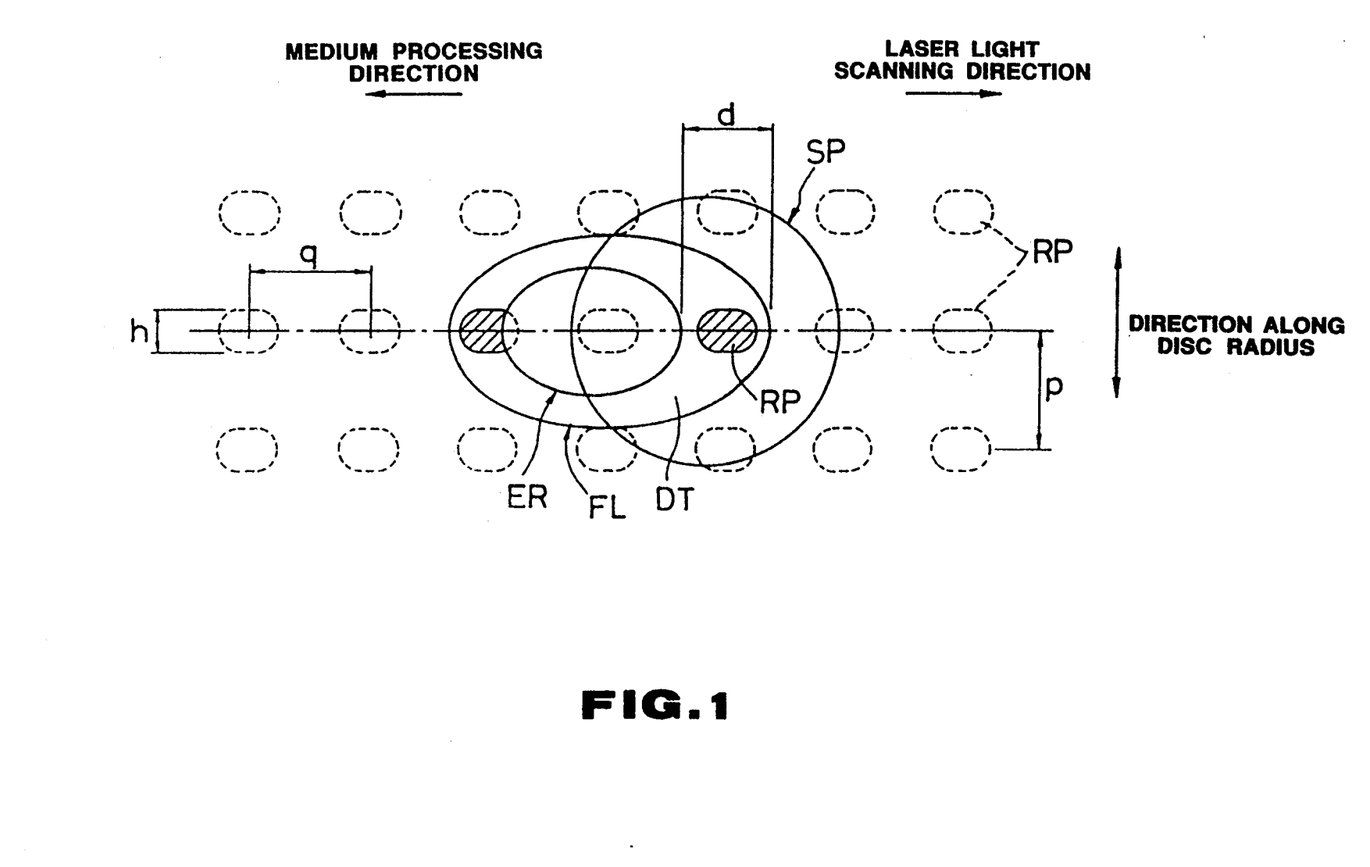
FIG. 1 is a plan view schematically showing a magneto-optical disc as an embodiment of the optical recording medium according to the present invention and a laser light-spot on the recording medium.

In the high density reproducing technique, shown in FIG. 1, a magneto-optical recording medium is employed, in which, by virtue of temperature distribution produced by laser radiation, a low-temperature area maintained in an initialized state within a beam spot SP, a high-temperature relief-recorded region FL in which magnetization in the recording holding layer has been transcribed to the surface reproducing layer, and a recording-erased region ER which has magnetization aligned in the direction of the impressed magnetic field for erasure by being further raised in temperature.

That is, the laser light is radiated to the recording medium which is in the initialized state in which the information recording pits are erased, for heating the recording medium for producing the elliptical relief-recorded region FL at a position slightly deviated rearward from the laser light spot SP in the scanning direction of the laser light. The recording-erased region ER at a higher temperature is formed within the recording-relieved region FL so that only a recording pit RP within an area not masked by the recording-erased region ER in the recording-relieved region FL, that is a signal detecting region DT, within the light spot SP, is read.

The signal detecting region DT may have a shorter pit interval along the laser light scanning direction, that is, a higher line recording density, because a distance d along the laser light scanning direction is narrower than the diameter of the light spot SP. On the other hand, the signal detecting region DT has a small distance in a direction at right angles to the laser light scanning direction so that crosstalk from neighboring tracks may be reduced, so that the pitch between neighboring tracks (so-called track pitch) p may be narrower or denser to raise the track density and hence the recording density.

In the embodiment of FIG. 1, as sizes of various parts of the recording pit RP, the pitch interval in the direction at right angles to the laser light scanning direction, of so-called track pitch, is p, the shortest interval between pits arrayed along the laser light scanning direction or track direction, or the shortest pit recording period (reciprocal of the line recording density) is q and a pit width in the direction at right angles to the laser light scanning direction (radial direction of the disc) is h. Although the recording pits RP are arrayed in FIG. 5 at the above-mentioned shortest recording period q, the arraying distance (as well as the pit length along the laser light scanning direction) may naturally be changed in conformity to recording data.

Figure 2:
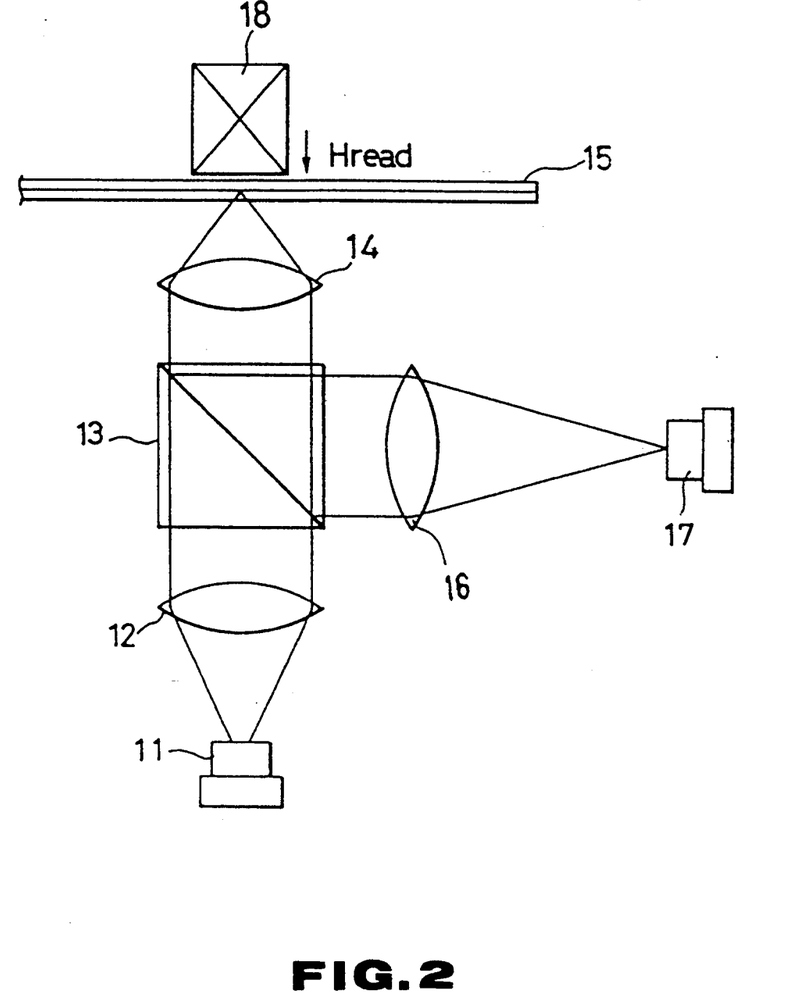
FIG. 2 is a schematic view showing a schematic arrangement of an optical system of a reproducing apparatus.

A reproducing apparatus for a magneto-optical disc, which is the magneto-optical recording medium shown in FIG. 1 arranged as a disc, is schematically shown in FIG. 2.

Referring to FIG. 2, a laser light radiated from a semiconductor laser 11 as a laser light source is collimated by a collimator lens 12 before being transmitted via a beam splitter 13 to an objective lens 14. The magneto-optical disc 15 is the magneto-optical recording medium explained in connection with FIG. 1. The laser beam radiated via objective lens 14 is reflected by the above-mentioned magnetic multi-layer film for photomagnetic recording so as to be incident on and reflected by beam splitter 13 via objective lens 14 before being converged by a converging lens 16 so as to be incident on a photodetector, such as a photodiode 17. A magnetic head 18 for impressing a reproducing magnetic field $H_{read}$ is arranged on the opposite surface of the magneto-optical disc 15 with respect to the laser light radiation position (the upper surface of the disc in the drawing).

Figure 3:
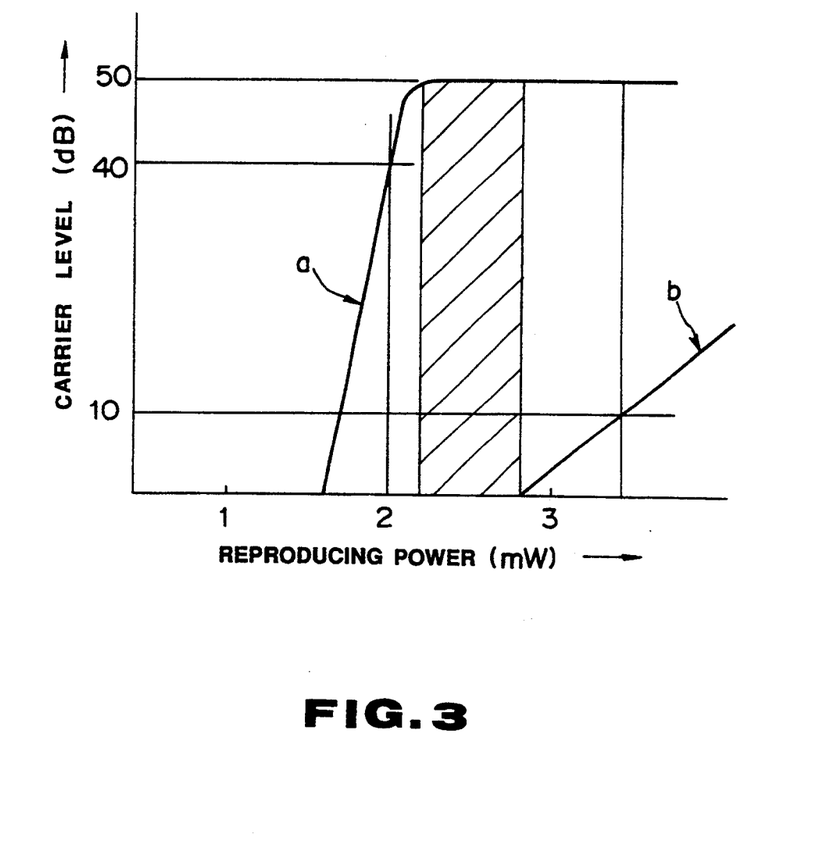
FIG. 3 is a view showing a carrier level of playback signals with respect to the reproducing laser power.

FIG. 3 shows the carrier level for playback signals (plotted on the ordinate) with respect to the playback laser power (plotted on the abscissa) for the case in which, when the wavelength λ of the laser light is 0.78 μm and the numerical aperture of the object lens 14 is 0.5, that is when the spot diameter D on the recording medium is 1.22 λ/NA=1.9 μm, the track pitch p is selected to be 0.8 μm, which is not more than one-half the spot diameter D=1.9 μm, as an example. In FIG. 3, a curve a indicates a main carrier component and a curve indicates a crosstalk component. A hatched area in FIG. 3 indicates a range for which the carrier to noise (crosstalk) ratio or so-called C/N ratio of 50 dB may be obtained. The reproducing power for this case is about 2.2 to 2.8 mW, which is in a range of ±10% on either sides of about 2.5 mW as a center.

If various conditions, such as required in ordinary reproducing apparatus, are taken into account the C/N ratio of 50 dB is sufficient for achieving effective sinal reproduction. Besides, the margin of ±10% or more which may be set for the reproducing laser power is sufficient to take account of the fluctuations in sizes or characteristics of various devices such as semiconductor laser 11. In this manner, effective signal reproduction may be achieved with the track pitch p=0.8 μm which is not more than one-half the spot diameter (D=1.8 μm), while the fluctuations in the semiconductor laser 11 or the like devices may be tolerated to permit mass production of reproducing apparatus.

Moreover, should effective reproduction be possible with the C/N ratio of 40 dB, the reproducing power may have a value in a wider range of about 2 to 3.5 mW. Besides, if the margin of fluctuations of ±10% is adopted, signal reproduction may be achieved with a narrower track pitch p to render it possible to design the actual products in this line.

The above-mentioned magneto-optical recording medium, which is capable of high density reproduction as described above, is hereinafter explained.

The present Applicant has previously proposed in e.g. Japanese Laid-Open Patent No. 1-143041 (1989) and Japanese Laid-Open Patent No. 1-143042 (1989) a method for reproducing information signals for a magneto-optical recording medium wherein information bits (magnetic domains) are enlarged, diminished or reduced to zero during reproduction for improving the playback resolution. The essential point of the technology consists in that the recording magnetic layer is an exchange-coupled multi-layer film composed of a reproducing layer, an intermediate layer and a recording layer, and in that the magnetic domain of the reproducing layer heated by the playback light beam during reproduction is enlarged, diminished or erased at a zone of higher temperatures for diminishing the inter-bit interference during reproduction to render it possible to reproduce signals having a period lower than the light diffraction threshold. There is also proposed in the application documents of JP Patent Application No. 1-229395 (1989) a technology in which the recording layer of the magneto-optical recording medium is formed by a multi-layer film including a reproducing layer and a recording holding layer magnetically coupled to each other, the direction of magnetization is aligned in advance to an erased state, the reproducing layer is heated to a temperature higher than a predetermined temperature by radiation of the laser light during reproduction, and in which magnetic signals written on the recording holding layer only in this heated state are read out while being transcribed on the reproducing layer to eliminate signal crosstalk to improve the line recording density and the track density.

Figure 4A:
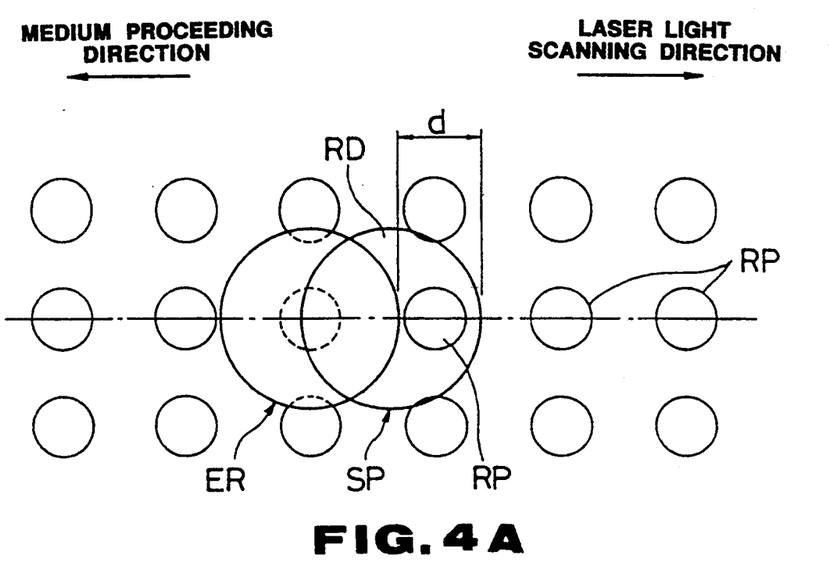
FIGS. 4A and 4B are a plan view and a cross-sectional view, respectively, showing the state in which the laser light is radiated on an erasure type magneto-optical recording medium.
Figure 4B:
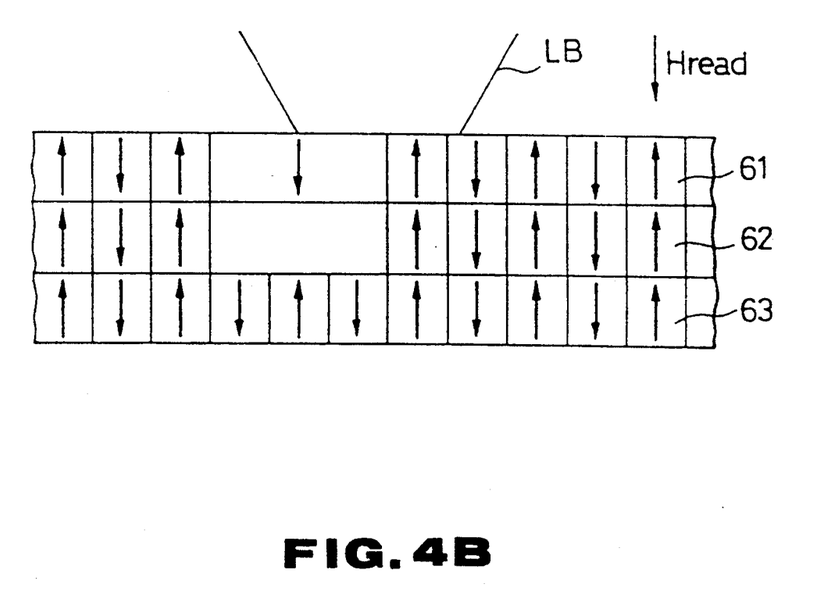
Figure 5A:
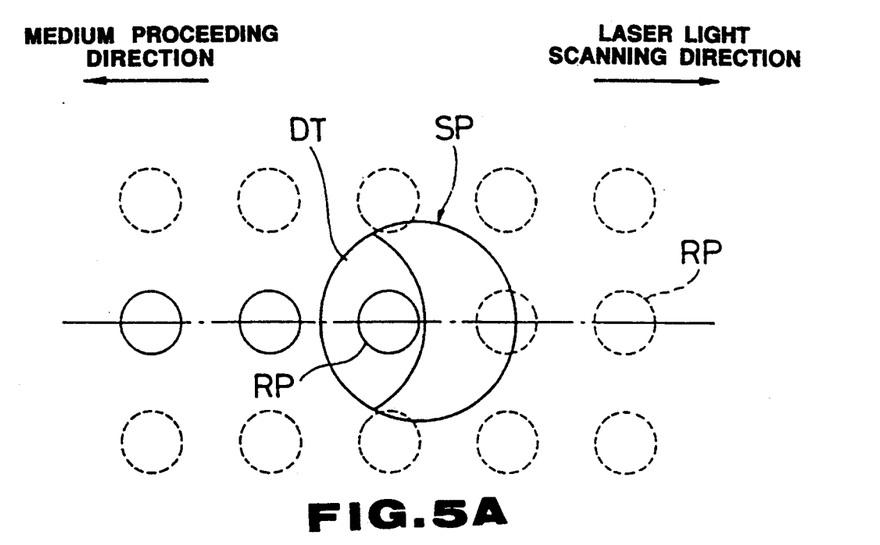
FIGS. 5A and 5B are a plan view and a cross-sectional view, respectively, showing the state in which the laser light is radiated on a relief type magneto-optical recording medium.
Figure 5B:
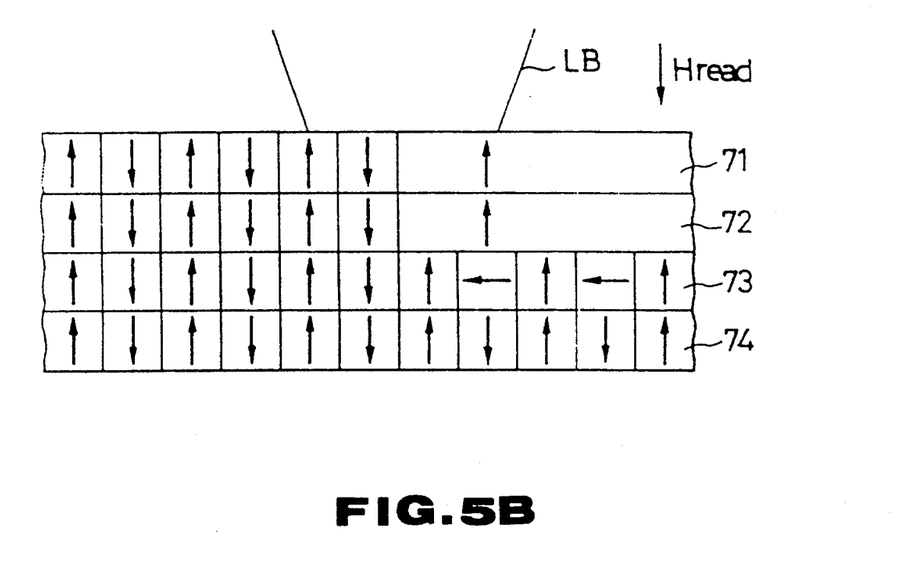

The above-described high density reproducing technology may be roughly classified into an erasure type and a relief type, shown schematically in FIGS. 4 and 5, respectively.

Referring first to FIGS. 4A and 4B, the erasure type high density reproduction technique is explained. With the erasure type, the recording medium, on which information recording pits RP are exhibited at room temperature, is heated by radiation of a laser light LB to produce a recording-erased region ER within the beam spot SP of the radiated laser light LB, and the recording pit RP within a remaining region RD within the light spot SP is read, by way of achieving reproduction with improved line density. In sum, this technique consists in that when reading the recorded pit RP within the light spot SP, the recording-erased region ER is used as a mask to narrow the width d of the read-out region RD to provide for reproduction with increased density along the scanning direction of the laser light (track direction), that is, with increased line recording density, as well as to increase the density along the direction at right angles to he scanning direction, that is the track density.

The recording medium for erasure type high density reproduction has an exchange-coupled magnetic multi-layer film structure composed of an amorphous rare earth for photomagnetic recording (Gd, Tb)—iron group (Fe, Co) ferrimagnetic film. In an example shown at A in FIG. 4, the recording medium has a structure in which a reproducing layer as a first magnetic film 61, an interrupting layer (intermediate layer) as a second magnetic layer 62 and a recording holding layer as a third magnetic layer 63, are deposited in this order on a major surface (the lower surface in the drawing) of a transparent substrate formed e.g. of polycarbonate, not shown. The first magnetic layer (reproducing layer) 61 is e.g. a GdFeCo layer with a Curie temperature $T_{c1}>400°$ C., while the second magnetic layer (interrupting layer or an intermediate layer) 62 is e.g. a TbFeCoAl film having a Curie temperature $T_{c2}$ of 120° C. and the third magnetic layer (recording holding layer) is e.g. a TbFeCo layer with a Curie temperature $T_{c3}$ of 300° C. Meanwhile, arrow marks entered in the magnetic films 61 to 63 shown at C in FIG. 4 represent the direction of magnetization of the magnetic domains. $H_{read}$ represents the direction of the reproducing magnetic field.

The reproducing operation is briefly explained. At an ambient temperature below a predetermined temperature $T_{OP}$, the recording magnetic domain of the recording holding layer 63 is transcribed to the reproducing layer 61 by means of the interrupting layer 62. If the laser light LB is radiated on the recording medium for raising the medium temperature, changes in the medium temperature are produced with a time delay with the scanning of the laser light so that a region at a temperature higher than the predetermined temperature $T_{OP}$, that is the recording-erased region ER, is shifted slightly towards the rear side of the light spot SP along the laser scanning direction. At the temperature higher than the predetermined temperature $T_{OP}$, the magnetic domains of the reproducing layer 61 are aligned in the direction of the reproducing magnetic field $H_{read}$, so that recording is erased on the medium surface. In this manner, the recording of the region ER at a temperature higher than the predetermined temperature $T_{Op}$ is masked to achieve high density reproduction.

With the relief type high density reproducing technique, shown in FIG. 5, the recording medium in a state in which information recording pit RP are erased at ambient temperature (initialized state) is irradiated with a laser light and thereby heated to form a signal detecting region DT, as a recording-relieved region, within the beam spot SP of the laser light and only the recording pits RP within this signal detecting region DT is read for improving the playback line density.

The recording medium for such high density relief reproduction has a magnetic multi-layer structure according to magnetostatic coupling or magnetic exchange coupling. In an example shown in FIG. 5, a reproducing layer 71 as a first magnetic layer, a reproduction assistant layer 72 as a second magnetic layer, an intermediate layer 73 as a third magnetic layer 73 and a recording holding layer 74 as a fourth magnetic layer are stacked sequentially on a major surface (the lower surface in FIG. 3) of a transparent substrate, not shown, formed e.g. of polycarbonate. The first magnetic layer (reproducing layer) 71 is formed e.g. of GdFeCo and has a Curie temperature $T_{c1} > 300°$ C., the second magnetic layer (reproduction assistant layer) 72 is formed e.g. of TbFeCoAl and has a Curie temperature $T_{c2}$ of approximately 120° C. and the third magnetic layer (intermediate layer) 73 is formed e.g. of GdFeCo and has a Curie temperature $T_{c3}$ of approximately 250° C. and the fourth magnetic layer (recording holding layer) 74 is formed e.g. of TbFeCo and has a Curie temperature $T_{c4}$ of approximately 250° C. Arrows entered in the magnetic layers 71, 72, 73 and 74 indicate the direction of magnetization of magnetic domains. $H_{read}$ represents the direction of the reproducing magnetic field.

The operation during reproduction is explained briefly. The domains of the reproducing layer 71 and the reproduction assistant layer 72 are aligned before reproduction in one direction (in an upward direction in FIG. 5) by the initializing magnetic field. A reproducing magnetic field $H_{read}$ is applied in an inverse direction while a laser light LB is radiated. With scanning by the laser light temperature changes in the medium are produced with a delay, so that the region whose temperature exceeds a predetermined reproducing temperature $T_{RP}$ (recording-relieved region) is shifted slightly from the light spot SP towards the rear side along the scanning direction. With the temperature above the predetermined reproducing temperature $T_{RP}$, coercivity of the reproduction assistant layer 72 is lowered, so that when the reproducing magnetic field $H_{read}$ is applied, the magnetic wall is caused to disappear so that the information of the recording holding layer 74 is transcribed to the reproducing layer 71. Thus a region within the light spot SP which does not yet reach the reproducing temperature $T_{RP}$ is masked and the remaining region within the light spot SP becomes the signal detecting region as recording-relieved region DT to permit high density reproduction.

There is also devised a high density reproducing technique consisting in a combination of the erasure type and the relief type, as shown in FIG. 1. With this technique, the laser light is radiated to the recording medium in an initialized state thereof in which recording pits are extinct at room temperature for heating the recording medium for forming a recording-relieved region FL at a position slightly deviated towards the rear of the beam spot of the radiating laser light while simultaneously forming a recording-erased region of a higher temperature within the recording relieved region FL.

In the specification and the drawings of our co-pending JP Patent Application No. H 3-418110 (1991), there is proposed a signal reproducing method for a magneto-optical recording medium wherein a magneto-optical recording medium having at least a reproducing layer, an intermediate layer and a recording holding layer is employed, a laser light is radiated and a reproducing magnetic field is applied to the reproducing layer, a temperature distribution generated by the laser radiation is utilized to produce a region where an initialized state is maintained, a region to which the information of the recording holding layer is transcribed and a region the domains of which are aligned in the direction of the reproducing magnetic field, in a field of view of the lens, to produce a state equivalent to optically masking the field of view of the lens to increase the line recording density and the track density as well as to assure satisfactory frequency characteristics at the time of reproduction, in which there is no risk that the region of transcription of the information of the recording holding layer be diminished or enlarged even if the reproducing power is fluctuated.

According to the above-described high density reproducing technique employing such magneto-optical recording medium, only the read region RD, which is a partial region within the recording-relieved region, or the recording pit RP within the signal detecting region DT, is read within the light spot SP. Since the size of the read region RD or the signal detection region DT is smaller than the size of the light spot SP, the distance between adjacent pits in the directions along and at right angles to the laser light scanning direction may be reduced to raise the recording density to increase the recording capacity of the recording medium.

Meanwhile, as a tracking servo for achieving tracking during signal reproduction with such a high track density, a so-called sampling servo system or a technique of enlarging the track pitch in a servo-equivalent manner by a multiple light source beam is effective. The tracking servo by the multiple light source beam, which is a technique proposed by the present Applicant in the specification and drawings of our copending JP Patent Application No. H-2-142521, is explained briefly by referring to FIG. 6.

Figure 6:
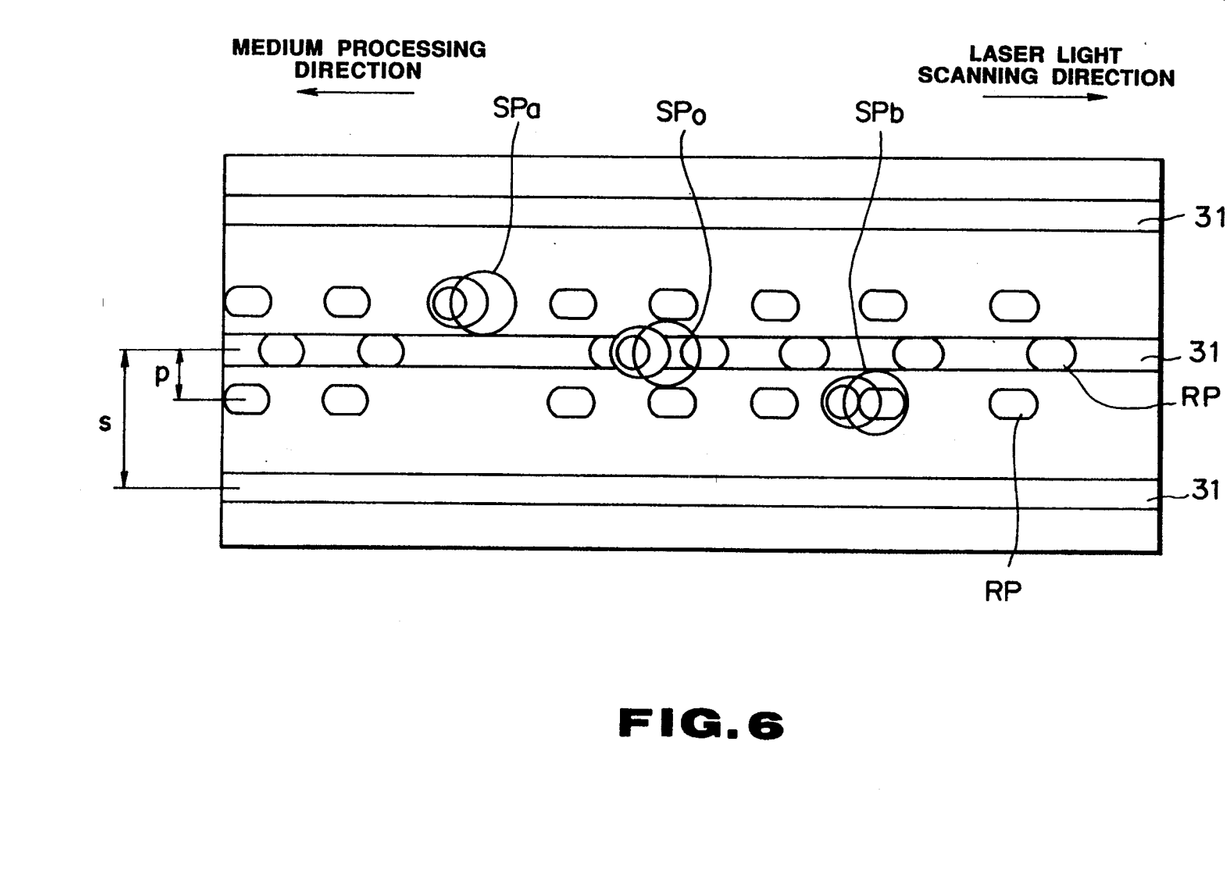
FIG. 6 is a view for illustrating the track servo by a multiple light source beam.

In FIG. 6, so-called guide grooves 31 are formed on the recording medium at an array pitch s which may, for example, be larger than the diameter of a light spot SP. Recording pits RP, arrayed at an array pitch p in a direction at right angles to the laser scanning direction, is equal to, for example, not more than one half the arraying pitch s of the guide grooves 31. A plurality of, for example, three light beams are radiated to the recording medium from laser light sources, not shown, with three light spots $SP_a$, $SP_b$ and $SP_c$ of these light beams being associated with three recording pit rows, or so-called recording tracks, arrayed at the above-mentioned arraying pitch p. If the central spot $SP_0$ of these three light spots is positioned on the guide groove 31, and tracking is performed only with this light spot the remaining two spots $SP_a$, $SP_b$ are guided for scanning the recording pit rows on both sides of the guide groove 31. In general, the arraying pitch p may be set to s/2n.

That is, as a general rule, plural light beams are radiated from laser light sources for generating plural light spots SP, offset from one another by ½n times the arraying pitch s of the guide grooves, on the recording medium, and an n number of signals (recording pits RP), the spatial phase of which is offset by ½n times the arraying pitch s of the guide grooves, are formed on the basis of these beam pots SP. These n number of signals are multiplied to generate tracking control signals having the spatial frequency equal to 1/n times the arraying pitch s of the guide grooves, and the tracking control is performed on the basis of these tracking control signals.

The above-described embodiment is directed to an example of using a magneto-optical disc capable of recording signals. The following description is made of an embodiment of the present invention in which the invention is applied to a variable reflectance type optical recording medium.

As the technique concerning the variable reflectance optical recording medium, the present Applicant has already proposed a signal recording method for an optical disc in the specification and drawings of JP Patent Application No.H-2-94452 (1990), and an optical disc in the specification and drawings of JP Patent Application H-2-291773 (1990). In the former, a signal reproducing method for an optical disc is disclosed, whereby a readout light is radiated to an optical disc, on which phase pits are formed depending on signals and which has reflectance values changed with temperatures, and the phase pits are read while the reflectance is partially changed within a scanning light spot of the readout light. In the latter, an optical disc of a so-called phase change type is disclosed, in which a layer of a material changed in reflectance with phase changes is formed on a transparent substrate which has reflectance values changed with phase changes and in which, when the disc is irradiated with the readout light the layer partially undergoes phase changes within the scanning spot of the readout light and is reset after readout is terminated.

The material of the layer is preferably such a material which may be crystallized after being melted and which, when the layer is irradiated with the readout light is changed into a liquid phase within the scanning spot of the readout light within a melted and crystallized region so as to be changed in reflectance, and is reset to a crystallized state after readout is terminated.

Figure 7:
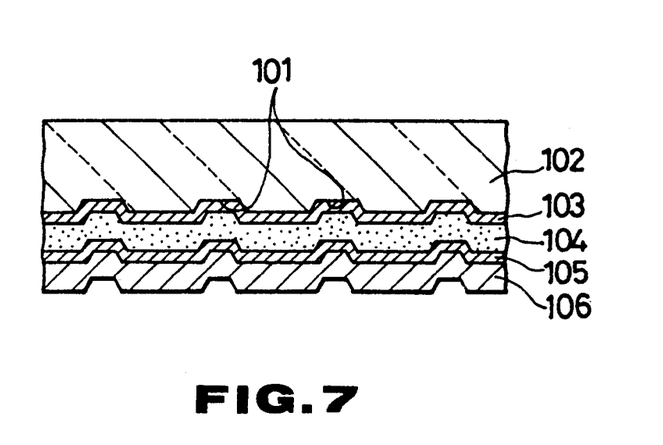
FIG. 7 is a schematic cross-sectional view showing essential parts of an example of a phase change type optical disc according to another embodiment of the optical recording medium of the present invention.

Referring to a schematic cross-sectional view of FIG. 7, showing the phase change type optical disc, a layer of a phase change material 104 is formed via a first dielectric layer 103 on a transparent substrate 102 on which phase pits 101 are formed, that is on the lower side in the drawing, a second dielectric layer 105 is formed on the layer 104 (on the lower side in the drawing, hereinafter the same) and a reflecting layer 106 is formed on the second dielectric layer. Optical characteristics, such as reflectance, are set by these first and second dielectric layers 103 and 105. If necessary, a protective layer, not shown, may be additionally deposited on the reflecting layer 106.

Figure 8:
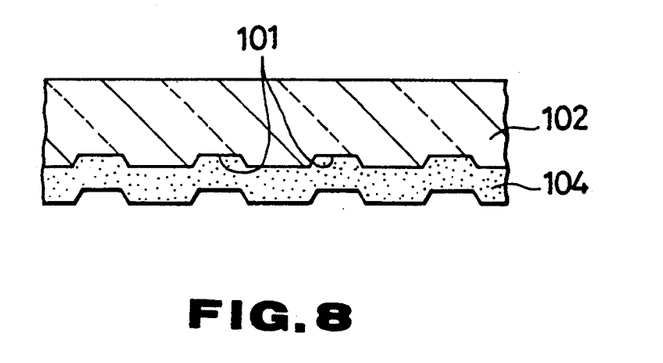
FIG. 8 is a cross-sectional view showing essential parts of a further example of the phase change type optical disc shown in FIG. 7.
Figure 9:
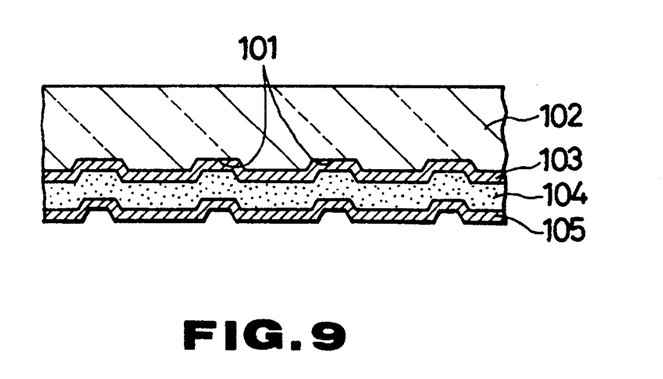
FIG. 9 is a schematic cross-sectional view showing essential parts of another example of the above-mentioned phase change type optical disc.

As alternative constitutions of the phase change type optical discs, only the phase change material 104 may be intimately deposited directly on the transparent substrate 102 on which pits are formed, as shown in FIG. 8, or a first dielectric layer 103, a phase change material layer 104 and a second dielectric layer 105 may be sequentially formed on the transparent substrate 102 on which phase pits 101 are formed, as shown in FIG. 9.

The transparent substrate 102 may be a substrate of synthetic resin, such as a glass substrate, polycarbonate or methacrylate. Alternatively, a photopolymer layer may be deposited on the substrate and phase pits 101 may be formed by a stamper.

The phase change material may be such material which undergoes partial phase changes within a scanning spot of the readout light and is reset after readout and the reflectance of which is changed with phase changes. Examples of the material include calcogenites, such as $Sb_2Se_3$, $Sb_2Te_3$, that is chalcogen compounds, other calcogenites or unitary calcogenites, that is calcogenitic materials, such as Se or Te, calcogenites thereof, such as BiTe, BiSe, In-Se, In-Sb-Te, In-SbSe, In-Se-Tl, Ge-Te-Sb or Ge-Te. If the phase change material phase 104 is constituted by chalcogen or calcogenite, its characteristics, such as heat conductivity or specific heat may be optimized for providing a satisfactory temperature distribution by the semiconductor laser readout light. Besides, the melted state in the melted and crystallized region as later explained may be established satisfactorily to generate ultra-high resolution with high S/N or C/N ratios.

The first dielectric layer 103 and the second dielectric layer 105 may be formed of, for example, $Si_3N_4$, SiO, $SiO_2$, AlN, $Al_2O_3$, ZnS or $MgF_2$. The reflective layer 106 may be formed of Al, Cu, Ag or Au, admixed with minor amounts of additives, if desi red.

As a concrete example of the phase change type optical disc, an optical disc having an arrangement shown in FIG. 7 is explained. With this optical disc, a layer of a material which may be crystallized on being melted is formed on a transparent substrate on which phase pits are previously formed. When a readout light is radiated, the layer of the phase change material is partially liquefied in a melted and crystallized region within the readout scanning light spot and is reset after readout of a crystallized state.

A so-called glass 2P substrate was used as the transparent substrate 102 of FIG. 7. Phase pits 101 formed on a major surface of the substrate 102 were of a track pitch of 1.6 μm, a pit depth of about 1200 Å and a pit width of 0.5 μm. A first dielectric layer 103 of AlN was deposited on one major surface of the transparent substrate 102 having these pits 101, and a layer of a phase change material 104 of $Sb_2Se_3$ was deposited on the layer 103 on the lower surface thereof in the drawing, hereinafter the same. A second dielectric layer 105 of AlN was deposited thereon and an Al reflective layer 106 was deposited on the layer 105.

The following operation was performed on a portion of the optical disc free from recorded signals, that is a mirror-surface part thereof free from phase pits 101.

A laser beam of e.g. 780 nm was radiated to be focused on a point of the optical disc which was then initialized by being allowed to cool gradually. The same point was then irradiated with a laser pulse with a laser power P set to $0 < P \leq 10$ μm. The pulse width was set to $260 \text{ nsec} \leq t \leq 2.6$ μm. The result is that if the reflectance is changed between two solid phase states before pulse irradiation and after pulse irradiation followed by cooling to room temperature, the layer is changed from a crystal state to an amorphous state. If the reflectance is not changed during this operation, but the amount of return light is once changed during radiation of the pulse light it is an indication that the film of the crystal state is once liquefied and again crystallized. The region in the melted state which has once become liquid and which may be returned to the crystallized state with lowering of temperature is termed a melted and crystallized region.

Figure 10:
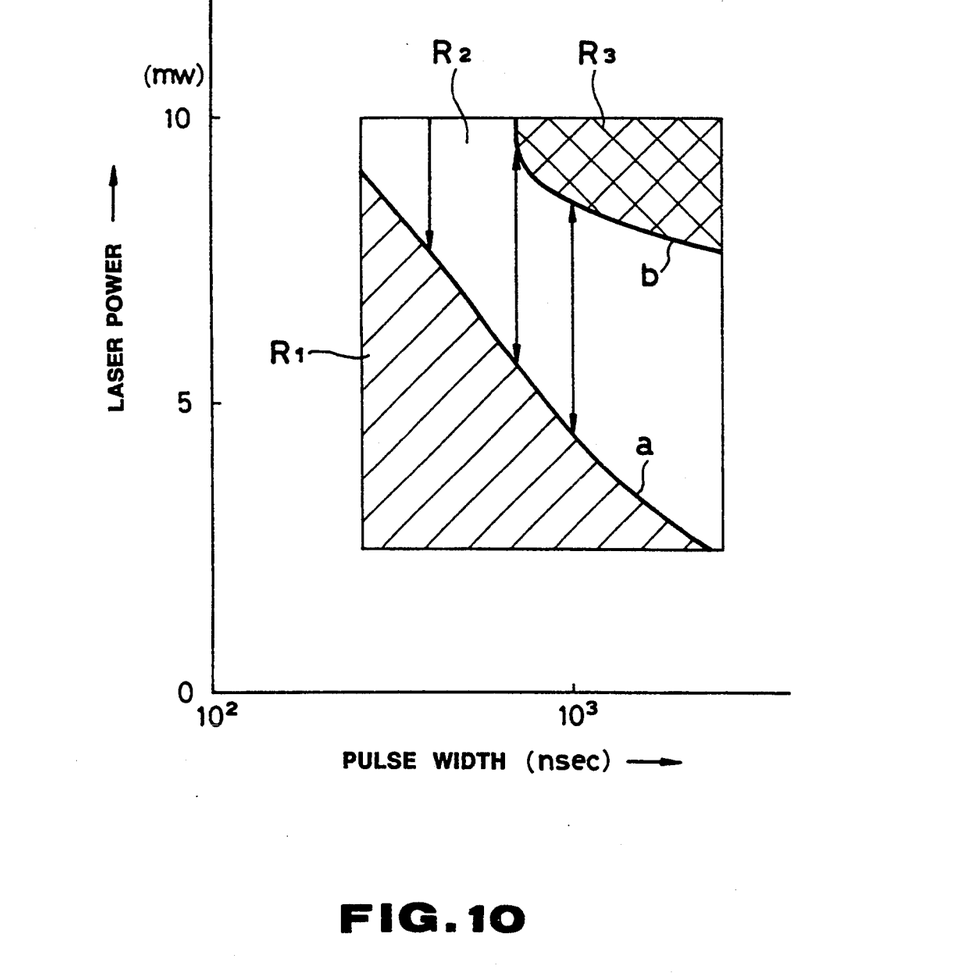
FIG. 10 is a view showing a phase change state for explanation of the above-mentioned phase change type optical disc.

FIG. 10 shows the phase states of the layer of the phase change material 104 of $Sb_2Se_3$ and values of a pulse width of the radiated laser pulse plotted on the abscissa and the laser light power plotted on the ordinate. In this figure, a hatched area $R_1$ below a curve a indicates a region in which the layer of the phase change material 104 is not melted, that is maintained in its initial state. In this figure, the region above curve a becomes liquid, that is melted, on laser spot irradiation. A region delimited between curves a and b is the melted and crystallized region which is reset to a crystal state when cooled to about the ambient temperature by elimination of the laser light spot and which thereby is turned into a solid phase. Conversely, a cross-hatched region $R_3$ above curve b is a melted amorphous region which is rendered amorphous when cooled and which is turned into a solid phase by elimination of the laser light spot.

In the present embodiment the reproducing laser power, optical disc constitution, material and the film thicknesses are selected so that in the course of cooling to ambient temperature from the heated state caused by readout light irradiation during reproduction, the time $\Delta t$ which elapses since the heated state brought about by irradiation of the readout light during reproduction until cooling to ambient temperature becomes longer than the time necessary for crystallization, so that the state of liquid phase in the melted and crystallized region $R_2$ FIG. 10 will be produced during reproduction.

In the above-described concrete embodiment the thicknesses etc. of the layers are so selected that the value of reflectance in the melted state is higher than that in the initialized state, that is in the crystallized state.

Figure 11:
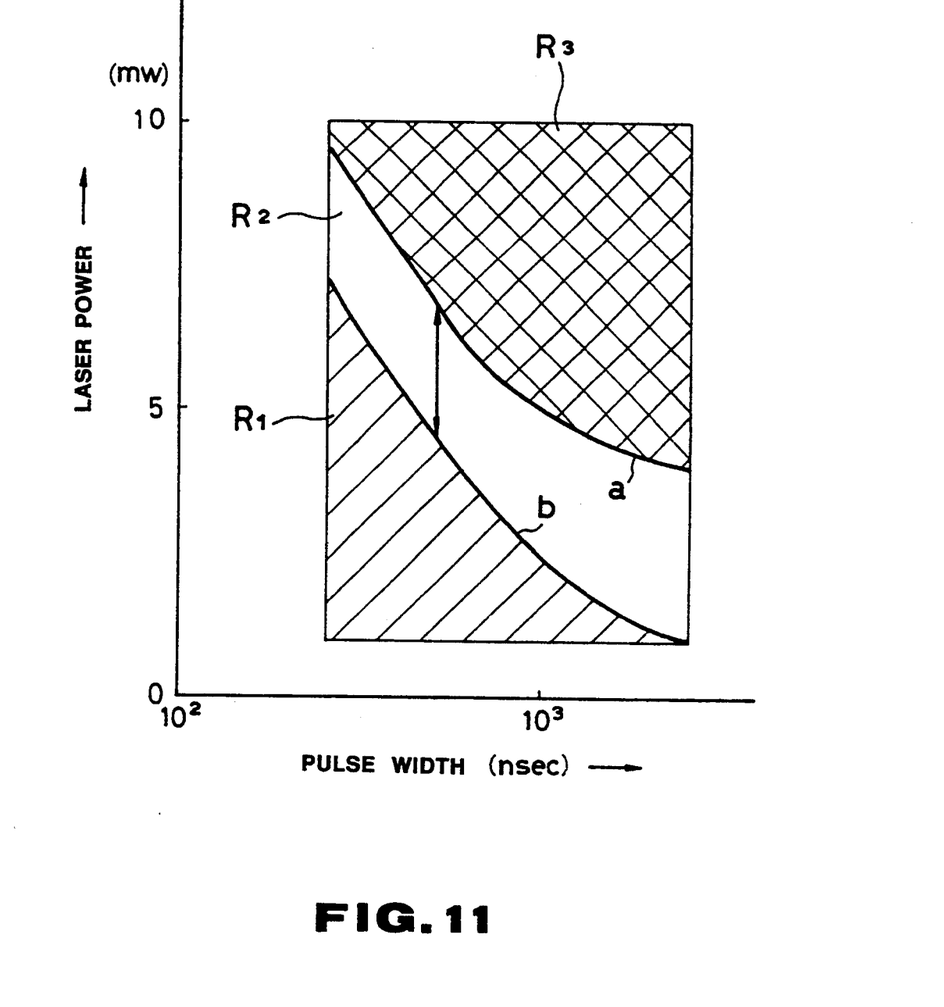
FIG. 11 is a view showing another phase change state for explanation of the above-mentioned phase change type optical disc.

FIG. 11 shows the results of measurement of the phase change states for another example of the phase change type optical disc making use of $Sb_2Te_3$ as a phase change material 104, similarly to FIG. 10. In FIG. 11, the parts corresponding to those of FIG. 10 are indicated by 1she same reference numerals. In the present example, the thicknesses etc. of the layers are so set that the value of reflectance in the melted slate is higher than that in the initialized state, that is in the crystallized state.

Meanwhile, with calcogenites or chalcogens, such as $Sb_2Se_3$ or $Sb_2Te_3$, the reflectance for the amorphous state is substantially equal to that in the melted state. The optical disc employed in the present embodiment is reproduced with an ultra-high resolution by taking advantage of temperature distribution within the scanning spot on the optical disc.

Figure 12A:
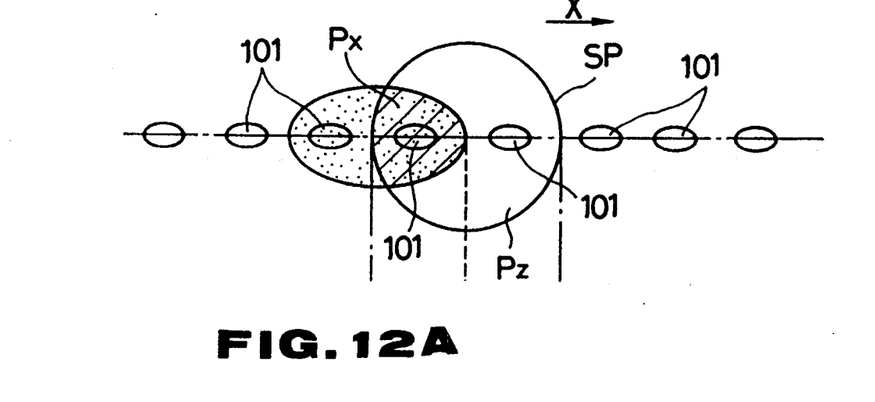
FIGS. 12A and 12B are a view showing the relation between the temperature distribution and the readout light spot for explanation of the above-mentioned phase change type optical disc.
Figure 12B:
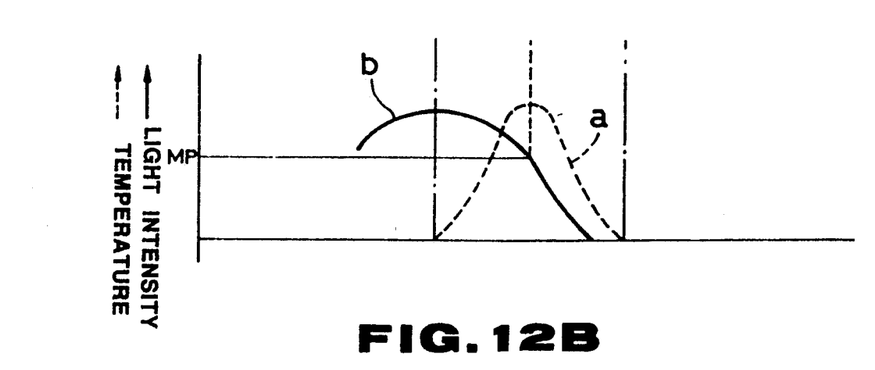

Referring to FIG. 12, explanation is given of the case in which a laser light is radiated on the phase change type optical disc.

In FIG. 12, the abscissa indicates a position of the light spot relative to the scanning direction X. A light spot SP formed on the optical disc on laser light radiation has a light intensity distribution as indicated by a broken line a. On the other hand, temperature distribution in the layer of the phase change type material 104 is shifted slightly rearward relative to the beam scanning direction X, as indicated by a solid line b, in association with the scanning speed of the beam spot SP.

If the laser light is scanned in the direction shown by arrow X, the optical disc as a medium is gradually raised fin temperature, from the distal side relative to the scanning direction of the light spot SP, until finally the temperature becomes higher than the melting point MP of the layer 104. At this stage, the layer 104 is in the melted state, from its initial crystal state, and is increased in e.g. reflectance, as a result of transition to the melted state. The reflectance of a hatched region $P_x$ within the light spot SP is increased. That is, the region $P_x$ in which the phase pit 101 can be read and a region $P_z$ remaining in the crystallized state and hardly readable exist within the light spot SP. That is, even when two phase pits 101, for example, exist in one and the same spot SP as shown, it is only the phase pit 101 present in the high reflectance region $P_x$ that can be read, whereas the other phase pit is present in the region $P_z$ with extremely low reflectance and hence cannot be read. In this manner, only the single phase pit 101 can be read even although plural phase pits 101 exist in the same spot SP.

In this manner, if the wavelength of the readout light beam is λ and the numerical aperture of the objective lens is NA, readout may be performed satisfactorily even when the minimum phase pit interval of the recording signals along the direction at right angles to the readout light or the so-called tack pitch, is not more than one half the spot diameter. Thus the signals may be read with ultra-high resolution to improve recording density, above all, the track density, to improve the recording capacity of the recording medium.

Figure 13:
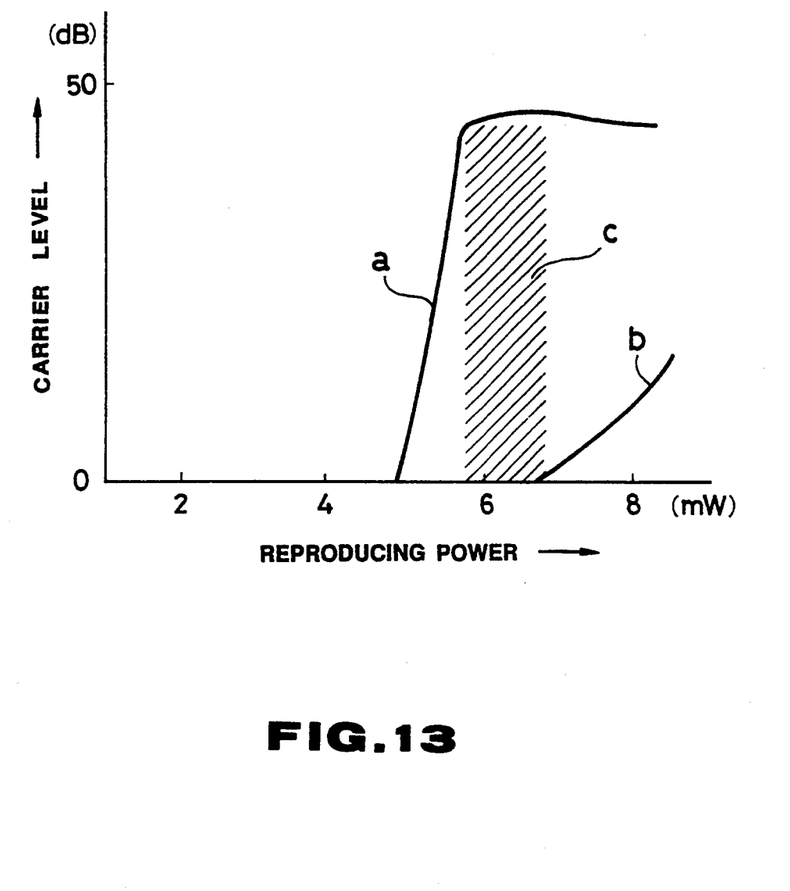
FIG. 13 is a graph showing a carrier level for playback signals with respect to the reproducing power for explanation of the above-mentioned phase change type optical disc.

Similarly to FIG. 3, FIG. 13 shows the carrier level for playback signals (plotted on the ordinate) with respect to the playback laser power (plotted on the abscissa) for the case in which, when the wavelength λ of the laser light is 0.78 μm and the numerical aperture of the objective lens 14 is 0.5, that is when the spot diameter D on the recording medium is $1.22 \lambda/\text{NA} = 1.9$ μm, the track pitch p is selected to be 0.8 μm, which is not more than one-half the spot diameter $D = 1.9$ μm, as an example. Ge-Sb-Te is used as the phase change material of the layer 104. In FIG. 13, a curve a indicates a main carrier component and a curve b indicates a crosstalk component. A hatched area c in FIG. 13 indicates a range for which the carrier to noise (crosstalk) ratio or so-called C/N ratio of 50 dB may be obtained. The reproducing power at this time is about 5.7 to 6.9 mW.

If the various conditions required in usual reproducing apparatus are taken into account the C/N ratio of 50 dB is a sufficient value to effect efficient signal reproduction. Besides, a sufficient margin is taken of the fluctuations of the reproducing laser power, such that effective signal reproduction may be achieved with the track pitch (p=0.8 μm) which is not more than the spot diameter (D=1.9 μm), while fluctuations of devices, such as semiconductor lasers 11, may be tolerated to permit mass production of the reproducing apparatus.

Besides, if the effective reproduction may be made with the C/N ratio of 40 dB, a wider range of the reproducing power may be realized, while signal reproduction may be achieved with a narrower track pitch p to permit mass production.

In the above embodiment operating conditions, such as film thicknesses, are set so that the reflectance is high or low when the layer of the phase change material 104 is in the melted state or in the crystallized state, respectively. However, the thickness or the constitution of each layer or the phase change material may be so set that the reflectance becomes low or high in the melted state or in the crystallized state, respectively, in which case a phase pit may be present in the high temperature region $P_x$ in the light spot SP shown in FIG. 12 so that only this phase pit in the high temperature region $P_x$ is read. In the case of an irreversible phase change in which a region is raised in temperature by laser light irradiation to reach the melted and crystallized region $R_3$ such that it cannot be reset to the initialized state or crystallized state if cooled to ambient temperature, it is only necessary to perform some initializing operation without departing from the scope of the present invention. For example, by radiating an elliptical spot after the reproducing laser spot for heating the layer 104 to the melted and crystallized region $R_2$, or by heating to a temperature lower than the melting point MP and not lower than the crystallization temperature, the layer 104 may be initialized by being reset from the amorphous state to the crystallized state.

Although the reflectance is changed in the above embodiment by phase changes of the recording medium, the reflectance may be changed by taking advantage of any other phenomenon. Thus, for example, the reflectance may be changed by temperature by taking advantage of changes in spectral characteristics caused by moisture adsorption by an interference filter according to a modified embodiment shown in FIG. 14.

Figure 14:
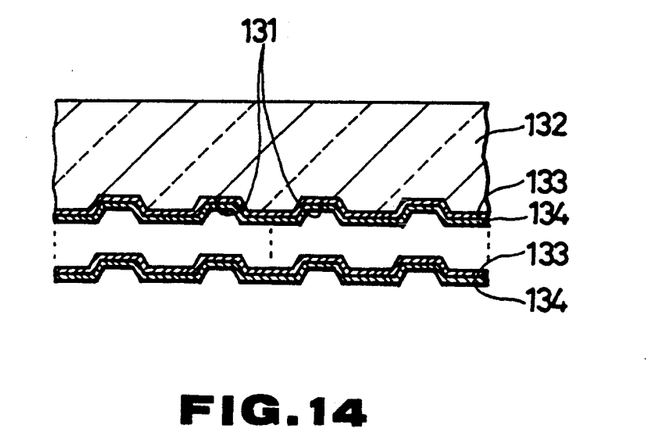
FIG. 14 is a schematic cross-sectional view showing essential parts of a variable reflectance type optical disc using an interference filter according to a further embodiment of the present invention.
Figure 15:
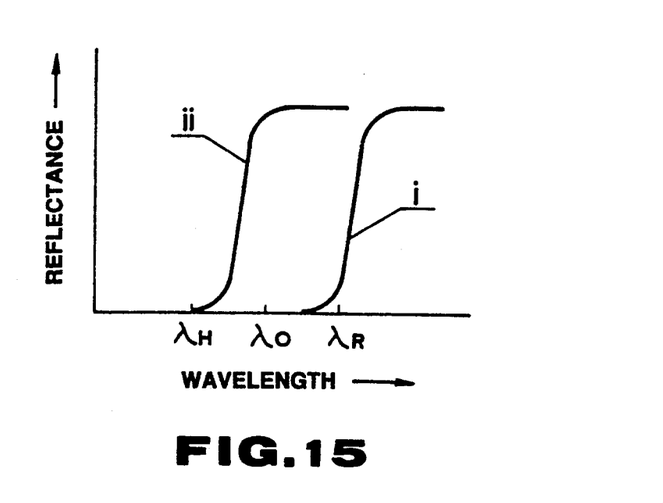
FIG. 15 is a graph showing the manner of changes in reflectance spectral characteristics with temperature in the interference filter.

In the embodiment shown in FIG. 14, materials with markedly different refractive indices are repeatedly deposited on a transparent substrate 132, on which phase pits 131 are formed, to thicknesses equal to one fourths of the wavelength λ of the reproducing light for forming an interference filter. In the present embodiment an MgF layer 133 (with a refractive index of 1.38) and an ZnS layer 134 (with a refractive index of 2.35) are used as the materials with markedly different refractive indices. However, any other combinations of the materials having larger differences in refractive indices may be employed. For example, SiO having a lower refractive index of 1.5 may be used as a low refractive index material, and $TiO_2$ with a refractive index of 2.73 or $CeO_2$ with refractive index of 2.35 may be used as a high refractive index material. The above-mentioned MgF layer 133 or the ZnS layer 134 are deposited by evaporation. If the reached vacuum is set to a value of e.g. $10^{-4}$ Torr which is lower than a usual value, the film structure becomes porous to permit the moisture to be captured. With the interference filter formed by a film which thus has captured the moisture, the reflectance and spectral characteristics are changed markedly between the state in which the filter is at room temperature and the state in which the filter is heated to close to the boiling point of water, as shown in FIG. 15. That is, an acute wavelength shift is observed, in which spectral characteristics at room temperature are as shown by a curve i having a point of inflection at a wavelength $\lambda_R$ and in which the characteristics at approximately the boiling point are as shown by a curve ii having a point of inflection at wavelength $\lambda_H$ and are returned to the characteristics shown by curve i on lowering the temperature. This phenomenon may be probably caused by acute changes in refractive index due to vaporization of moisture resulting in changes in spectral characteristics. Therefore, if the wavelength of the light source of the reproducing light is selected to a wavelength $\lambda_0$ intermediate between these points of inflection $\lambda_R$ and $\lambda_H$, the reflectance is dynamically changed between the state of room temperature and the heated state.

In the present embodiment, high density reproduction is performed by taking advantage of these changes in reflectance. The mechanism of high density reproduction is described in connection with FIG. 12. In this case, the region in which the moisture is vaporized to produce a wavelength h shift corresponds to the high reflectance region, while the portion of the medium in which the temperature is not raised is the mask region. In the present embodiment, the reflectance characteristics are reverted to the original state when the temperature is lowered, so that no particular erasure operation is required.

It is to be noted that the present invention is not limited to the above-described embodiments, but may be applied to, for example, a card- or sheet-shaped optical recording medium besides the disc-shaped recording medium.

Although various minor changes and modifications might be proposed by those skilled in the art, it will be understood that we wish to include within the scope of the patent warranted hereon all such changes and modifications as reasonably come within our contribution to the art.

What is claimed is:

1. An optical recording medium, comprising: a multi-layer film as a recording layer, said multi-layer film having at least a reproducing layer and a recording holding layer magnetically coupled to each other, said recording holding layer having signals magnetically recorded therein previously, said reproducing layer having magnetic domains aligned previously such that when a readout light is radiated to the reproducing layer of the magneto-optical recording medium for heating the reproducing layer, said signals are converted under photomagnetic effects into optical signals which are read from the reproducing layer, a pit arraying pitch of recording signals along a direction at right angles to a readout light scanning direction being selected to be not more than one half a spot diameter of the readout light and a signal detecting region encompassing a recording pit centrally of the laser light spot but not intersecting directly adjacent recording pits within the laser light spot lying at right angles to said readout light scanning direction and spaced from said recording pit within said signal detecting region.

2. A medium according to claim 1 wherein said laser light spot also contains in addition to said signal detecting region, a portion of a recording erased region and a portion of a recording relieved field.

* * * * *